US011409874B2

(12) United States Patent
Linton et al.

(10) Patent No.: US 11,409,874 B2
(45) Date of Patent: Aug. 9, 2022

(54) COPROCESSOR-ACCELERATED VERIFIABLE COMPUTING

(71) Applicant: INTERNATIONAL BUSINESS MACHINES CORPORATION, Armonk, NY (US)

(72) Inventors: Jeb R. Linton, Manassas, VA (US); James R. Kraemer, Santa Fe, NM (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 16/503,424

(22) Filed: Jul. 3, 2019

(65) Prior Publication Data

US 2021/0004465 A1    Jan. 7, 2021

(51) Int. Cl.

| H04L 9/08 | (2006.01) |
| G06F 21/57 | (2013.01) |
| G06F 21/12 | (2013.01) |
| H04L 9/30 | (2006.01) |
| G06F 9/38 | (2018.01) |
| G06F 12/0815 | (2016.01) |
| G06F 13/16 | (2006.01) |

(52) U.S. Cl.
CPC ............ *G06F 21/57* (2013.01); *G06F 9/3877* (2013.01); *G06F 12/0815* (2013.01); *G06F 13/1652* (2013.01); *G06F 21/12* (2013.01); *H04L 9/30* (2013.01)

(58) Field of Classification Search
CPC .... G06F 9/3877; G06F 21/57; G06F 12/0815; G06F 13/1652; G06F 21/12
See application file for complete search history.

(56) References Cited

U.S. PATENT DOCUMENTS

| 6,138,220 | A | * | 10/2000 | Gaultier | ................... | G11C 8/04 |
| | | | | | | 711/137 |
| 6,473,777 | B1 | * | 10/2002 | Hendler | ................ | G06F 9/3879 |
| 9,177,153 | B1 | * | 11/2015 | Perrig | ..................... | G06F 21/57 |
| 2003/0182561 | A1 | * | 9/2003 | Challener | ............... | G06F 21/57 |
| | | | | | | 713/189 |

(Continued)

OTHER PUBLICATIONS

Harrison, O. et al., "AES on Graphics Processing Units", Trinity College Dublin Ireland (date not available); 19 pgs.

(Continued)

*Primary Examiner* — Tongoc Tran
(74) *Attorney, Agent, or Firm* — Intelletek Law Group, PLLC; Gabriel Daniel, Esq.

(57) ABSTRACT

A verifiable computing system is presented. A worker computing device of the verifiable computing system receives a primary program and a verification logic that are generated based on a target function. The worker computing device includes a main processor and a coprocessor. The main processor is configured to execute the primary program and the coprocessor is configured to implement the verification logic. Telemetry is collected from the main processor executing the primary program and provided to the coprocessor. The coprocessor implementing the verification logic uses the telemetry to generate a proof. The proof is provided to a verifying computing device for determining whether the primary program is tampered with.

19 Claims, 8 Drawing Sheets

(56) References Cited

U.S. PATENT DOCUMENTS

| | | | | |
|---|---|---|---|---|
| 2004/0073806 A1* | 4/2004 | Zimmer | ............ | G06F 21/57 |
| | | | | 713/189 |
| 2005/0251857 A1* | 11/2005 | Schunter | ............ | G06F 21/57 |
| | | | | 726/16 |
| 2009/0070553 A1* | 3/2009 | Wallach | ............ | G06F 9/30185 |
| | | | | 712/34 |
| 2010/0146267 A1 | 6/2010 | Konetski et al. | | |
| 2011/0219434 A1 | 9/2011 | Betz et al. | | |
| 2013/0125244 A1* | 5/2013 | Sugano | ............ | G06F 21/44 |
| | | | | 726/26 |
| 2014/0108786 A1* | 4/2014 | Kreft | ............ | H04L 9/0643 |
| | | | | 713/156 |
| 2014/0181352 A1* | 6/2014 | Conrad | ............ | G06F 1/3206 |
| | | | | 713/320 |
| 2016/0196415 A1* | 7/2016 | Liu | ............ | G06F 21/57 |
| | | | | 726/18 |
| 2017/0185344 A1 | 6/2017 | Kirshenbaum | | |
| 2017/0251368 A1* | 8/2017 | Ross | ............ | H04W 12/03 |
| 2017/0278100 A1 | 9/2017 | Kraemer et al. | | |
| 2017/0308706 A1* | 10/2017 | Ray | ............ | G06F 9/4416 |
| 2018/0294962 A1 | 10/2018 | Kraemer et al. | | |
| 2019/0392149 A1* | 12/2019 | Yamashita | ............ | G06F 21/57 |
| 2020/0126116 A1* | 4/2020 | Smith | ............ | G06Q 30/0248 |
| 2020/0192676 A1* | 6/2020 | Pearce | ............ | G06F 9/5038 |
| 2020/0272597 A1* | 8/2020 | Kesiraju | ............ | G06F 15/8053 |

OTHER PUBLICATIONS

Li, L. et al., "Design of Multi Cipher Processing Architecture for Random Cross Access"; Microprocessors and Microsystems (2018); vol. 61; pp. 336-343.

Mell, P. et al., "Recommendations of the National Institute of Standards and Technology"; NIST Special Publication 800-145 (2011); 7 pgs.

Schaumont, P. et al., "Interactive Cosimulation with Partial Evaluation"; Proceedings of the Conference on Design, Automation and Test in Europe; vol. 1; IEEE Computer Society (2004); 6 pgs.

* cited by examiner

COPROCESSOR-ACCELERATED VERIFIABLE COMPUTING

BACKGROUND

Technical Field

The present disclosure generally relates to verifiable computing.

Description of the Related Arts

Verifiable computing (or verified computing) enables a computer to offload computation of some function to worker computing devices that may or may not be trustworthy, while maintaining verifiable results. The worker computing devices evaluate the function and return the result with a proof that the computation of the function was carried out correctly. Verifiable computing may also be used by a computing device running a untrusted program to verify that the program is operating as expected. The introduction of verifiable computing arises from the increasingly common phenomenon of outsourcing computation to untrusted user devices and also from the growing desire of computationally weak clients to outsource tasks to computationally powerful services such as cloud computing.

SUMMARY

Some embodiments of the disclosure provide a verifiable computing system. A worker computing device of the verifiable computing system receives a primary program and a verification logic that are generated based on a target function. The worker computing device includes a main processor and a coprocessor. The main processor is configured to execute the primary program and the coprocessor is configured to implement the verification logic. Telemetry is collected from the main processor executing the primary program and provided to the coprocessor. The telemetry may include program states of the primary program running on the main processor. The coprocessor implementing the verification logic uses the telemetry to generate a proof. The proof is provided to a verifying computing device for determining whether the primary program is tampered with.

In some embodiments, the telemetry is transferred through a one-way transparent bus. In some embodiments, the telemetry is stored in a data memory of the main processor, and the coprocessor is allowed to access the data memory of the main processor through a two-way cache-coherent interconnect. The coprocessor may modify content of the data memory, including temporary variables of the primary program, and the modified content may affect execution of the primary program.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a verifiable computing system that separates primary program processing from verification logic, specifically by running the primary program in a main processor (e.g., a central processing unit or CPU) and the verification logic in a coherently-attached highly parallel coprocessor. In such a system, program operation and system state collection are separated from the mathematical processing of that information when computing a proof. The telemetry of the main processor running the primary program is passed across a link to the coprocessor. The coprocessor uses parallelized computation to perform efficient mathematical operations based on the received telemetry to generate the proof. The proof may be transmitted out of band from the execution of the program to a verifier to prove that the program is not tampered with and the result of the program is not compromised. The design results in the efficient balancing and optimization of the main processor and coprocessor workloads.

In some embodiments, a two-way cache-coherent interconnect between the CPU and coprocessor is used as the link to pass the telemetry (including the collected system state) between the main processor and the coprocessor. The program running on the main processor may be directly affected by the calculation of proof and its results. In some other embodiments, a one-way transparent bus is used as the link to pass the telemetry between the main processor and the coprocessor. The calculation of the proof by the coprocessor may have no real time effect on the operations of the main processor running the program.

Figure 1B:
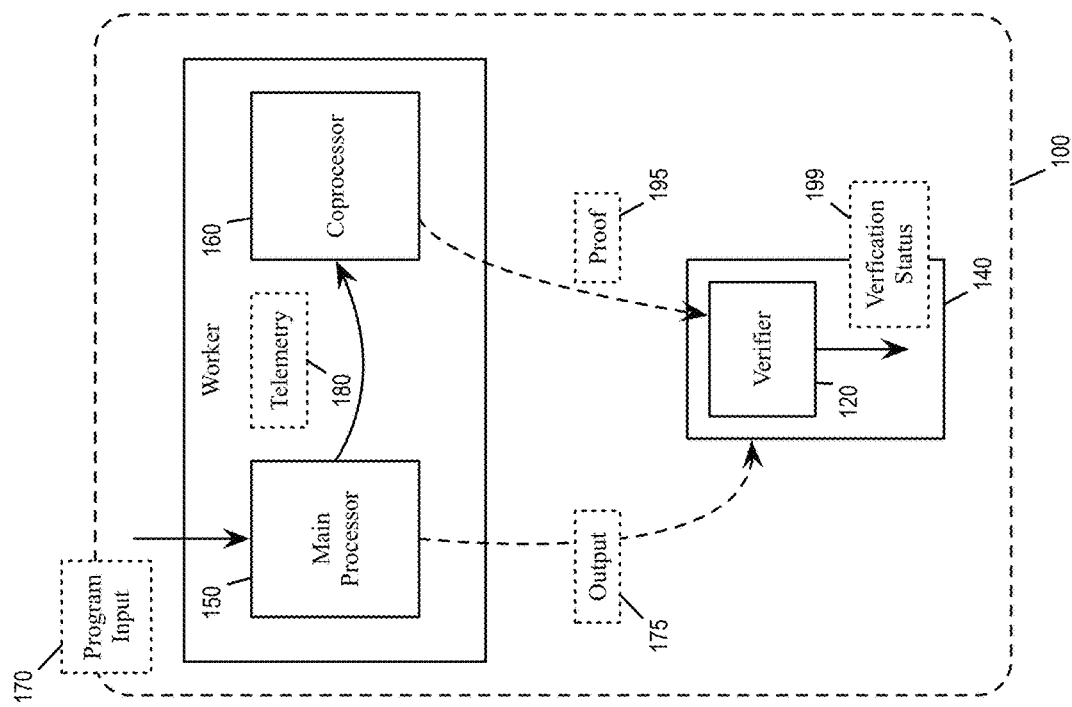
FIG. 1a-b conceptually illustrates a verifiable computing system that performs a target function by running a primary program in a main processor and a verification logic in a coprocessor, consistent with an exemplary embodiment.
Figure 1A:
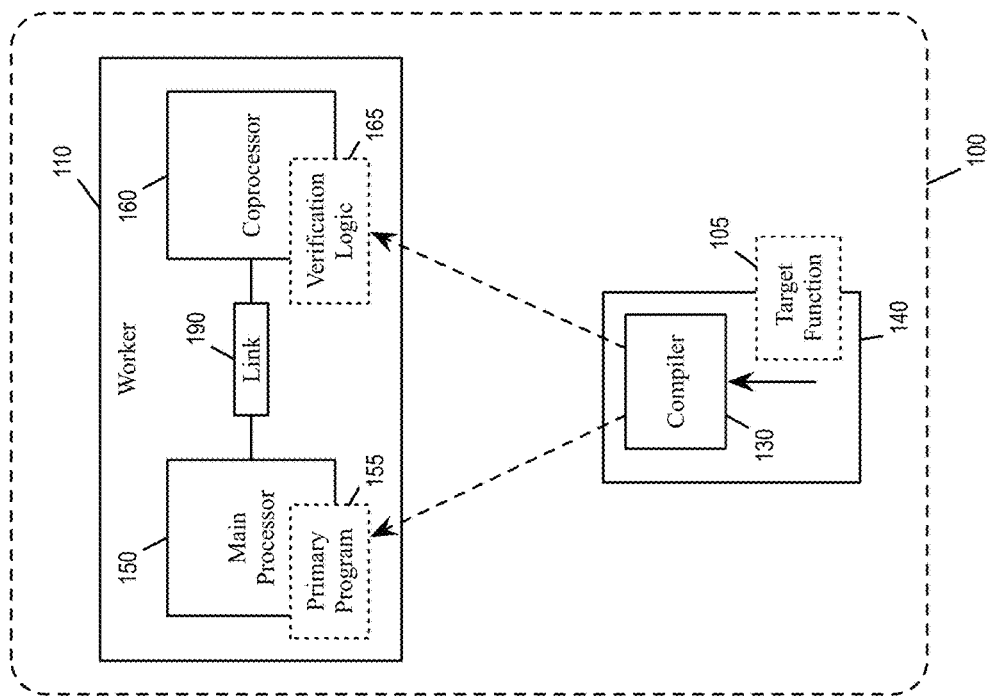

FIG. 1a-b conceptually illustrates a verifiable computing system 100 that performs a target function by running the primary program in a main processor and the verification logic in a coprocessor, consistent with an exemplary embodiment. In the example, a user uses the verifiable computing system to perform a target function 105 at one or more worker computing devices that the user may or may not trust. During performance of the target function or upon completion of the target function, the verifiable computing system produces a proof 195 to show that the worker computing devices executed the target function correctly and that the primary program of the target function is not tampered with.

The verifiable computing system 100 is implemented by a computing cloud, which interconnects a worker computing device 110 ("worker"), a verifier computing device 120 ("verifier"), and a compiler computing device 130 ("compiler"). In some embodiments, the worker computing device 110, the verifier computing device 120, and the compiler computing device 130 are resources in the computing cloud available to the user. The worker computing device 110 may or may not be trusted by the user, while the compiler computing device 130 and the verifier computing device 120 are trusted by the user. In some embodiments, a client computing device 140 ("client") trusted by the user implements the compiler computing device 130 and the verifier computing device 120.

The worker computing device 110 includes a main processor 150 and a coprocessor 160. In some embodiments, the main processor 150 and the coprocessor 160 are different integrated circuits (ICs) in the worker computing device 110. In some embodiments, the main processor 150 and the coprocessor 160 are modules of software instructions being executed by one or more processing units (e.g., a processor) of a computing device. In some embodiments, the main processor 150 and the coprocessor 160 are modules of hardware circuits implemented by one or more ICs of an electronic apparatus. An example computing device 700 that may implement the worker computing device 110, the verifier computing device 120, the compiler computing device 130, or the client computing device 140 will be described below by reference to FIG. 7.

The target function 105 is compiled into a primary program 155 and a verification logic 165. FIG. 1a illustrates the compilation of the target function 105 into the primary program 155 and the verification logic 165. The compiler computing device 130 compiles the source code of the target function 105 into the primary program 155 and the corresponding verification logic 165. The primary program 155 is compiled to be run by the main processor 150 and the verification logic 165 is compiled to be executed by the coprocessor 160 (or to configure the coprocessor 160). The primary program 155 is compiled to generate telemetry that includes program states of the primary program. In some embodiments, the primary program 155 is compiled to generate program states that are encoded and/or in particular positions and sequences. The verification logic 165 is compiled to process the generated telemetry from the primary program 155 and generate a proof.

FIG. 1b illustrates execution of the primary program by the main processor 150 and the verification logic 165 by the coprocessor 160. The main processor 150 executes the primary program 155 based on program input 170 to generate output 175. The program input 170 may be encrypted, or it may be a statement regarding an underlying secret as part of a zero-knowledge protocol. In some embodiments, the underlying secret is held by the worker computing device 110 and not revealed to the target function 105 and the client 140. In some embodiments, the underlying secret is held by the client computing device 140 and not revealed to the worker computing device executing the primary program 155.

The operations in the main processor 150 are monitored and recorded as instrumentation or telemetry 180. The telemetry 180 may include content of various memories, registers, or storage devices used by the main processor 150. The telemetry may also include data captured from buses interconnecting different components within the main processor 150. When the main processor 150 is executing the primary program 155 of the target function 105, the telemetry may include program states of the primary program. The telemetry 180 is made available to the coprocessor 160 through a link 190.

The coprocessor 160 includes resources capable of implementing highly parallelized computation for performing mathematical operations. The resources of the coprocessor 160 are configured by the verification logic 165 to process the telemetry 180 of the main processor 150 to generate the proof 195. FIG. 1b shows the coprocessor 160 generating the proof 195 based on the telemetry 180 from the main processor 150. In some embodiments, the telemetry 180 includes program states of the primary program 155, and the proof 195 is generated based on the program states. If the primary program has been tampered with or is otherwise compromised, the program states may not behave as expected and the proof 195 will fail the check at the verifier computing device 120.

The verifier computing device 120 receives the proof 195 and uses the proof to determine whether the primary program 155 has been tampered with. Specifically, the proof 195 is used to determine whether the primary program 155 has generated the program states in an expected fashion in order to arrive at the output 175. The proof 195 may also be used (e.g., by the verifier computing device 120) to determine whether the output 175 is validly generated by the main processor 150.

Figure 2:
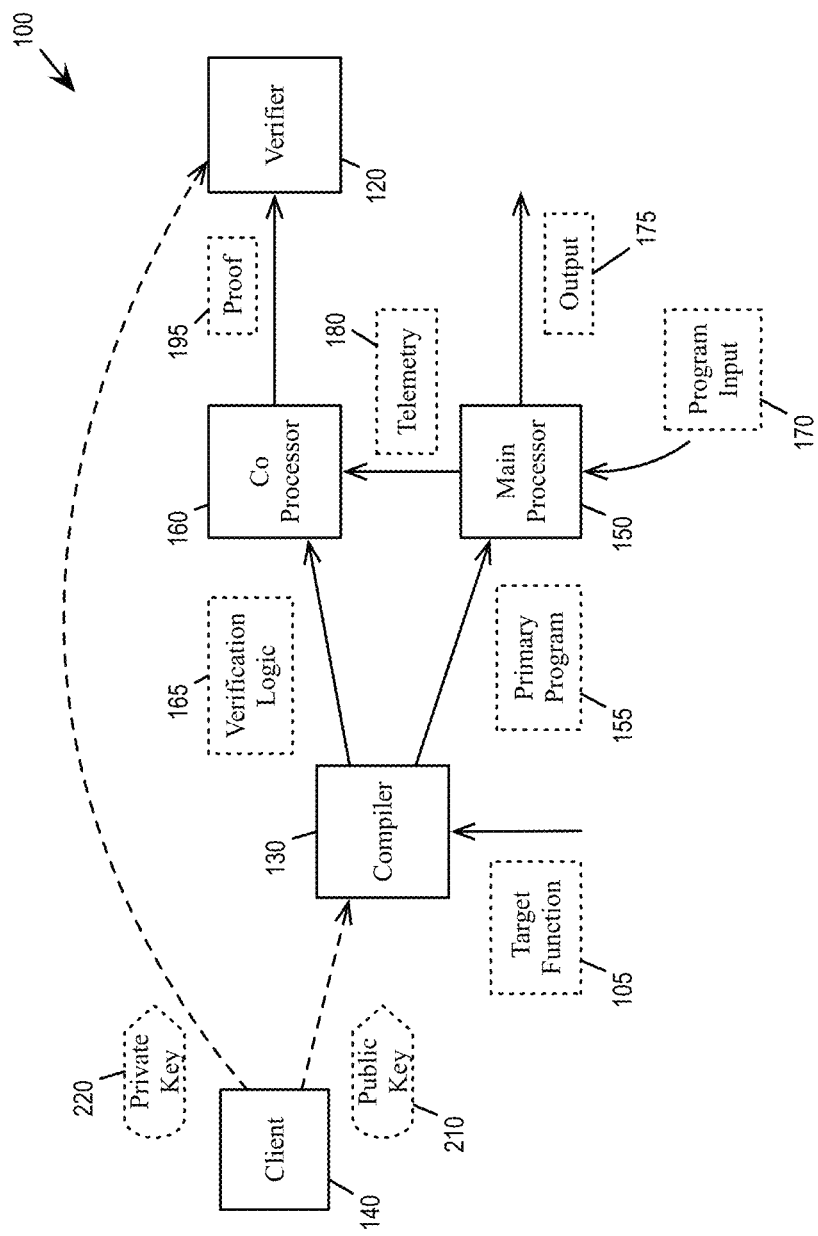
FIG. 2 conceptually illustrates dataflow of the verifiable computing system, consistent with an exemplary embodiment.

In some embodiments, the proof 195 is mathematically generated based on the program states in the telemetry 180 to ensure faithful execution of the target function without tampering. FIG. 2 conceptually illustrates dataflow of the verifiable computing system 100, consistent with an exemplary embodiment. As illustrated, the client computing device 140 generates two keys, a public key 210 and a private key 220 (or secret key). The keys 210 and 220 are generated based on a security parameter of the client. The private key 220 is to be used by the verifier 120 to verify the eventual proof 195. The public key 210 is used to compile the target function 105 and to generate the primary program 155 and the verification logic 165.

The program input 170 may be encrypted, or it may be a statement regarding an underlying secret as part of a zero-knowledge protocol. The main processor 150 is operating the primary program 155, which is configured to include program states in the telemetry 180. The coprocessor 160 is implementing the verification logic 165, which encodes the telemetry 180 into the proof 195 according to the public key 210. If the verification logic 165 and the primary program 155 are not tampered with, the proof 195 generated by the coprocessor 160 is expected to pass the check at the verifier 120 using the private key 220. However, if the primary program 155 or the verification logic 165 is compromised, the proof 195 is unlikely to pass the check at the verifier 120.

Figure 3:
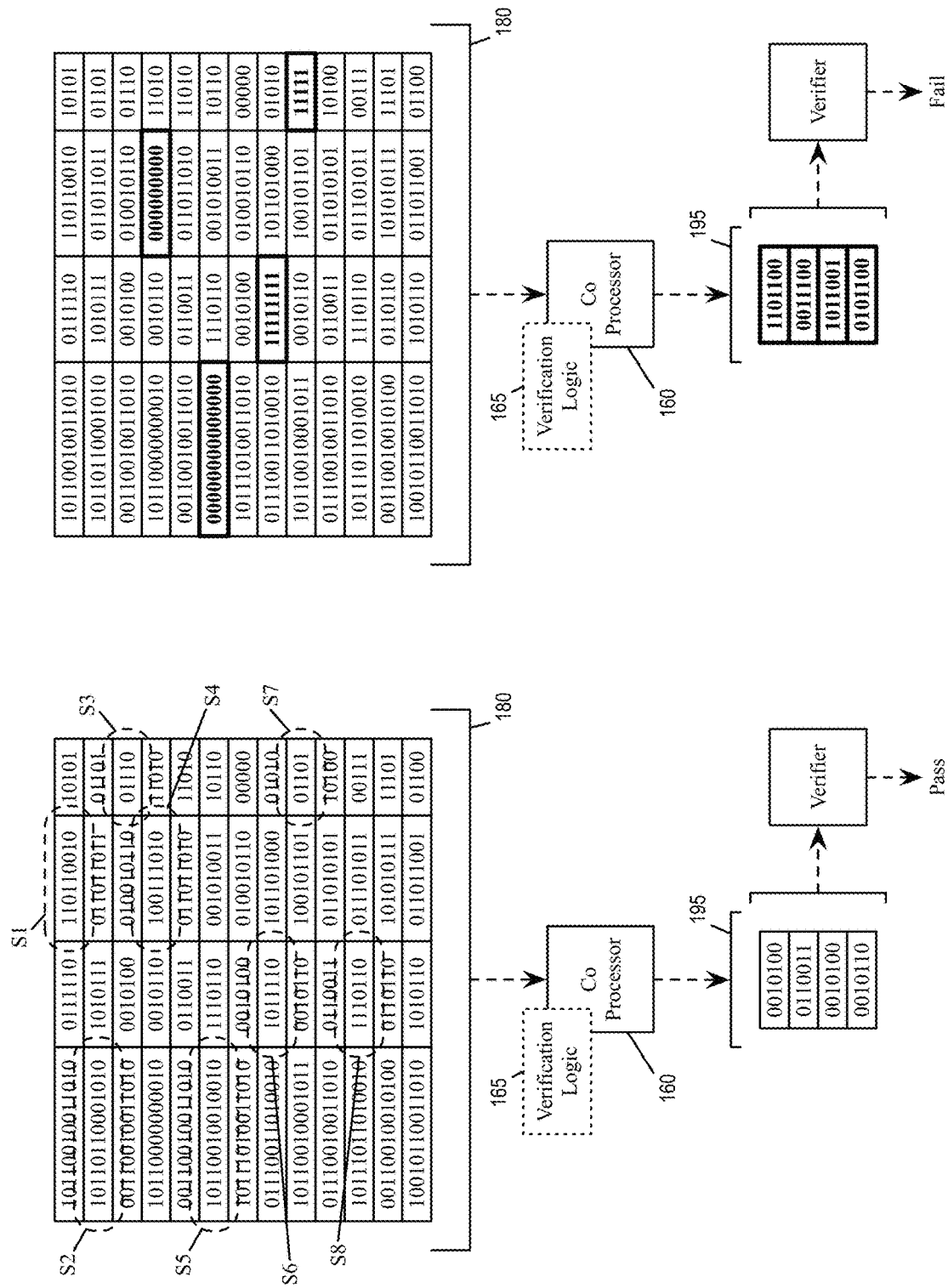
FIG. 3a-b conceptually illustrates generating the proof from telemetry.

FIG. 3*a-b* conceptually illustrates generating the proof from telemetry. The content of the telemetry is collected from various parts of the main processor 150. The content includes program states (e.g., S1 through S8) of the primary program. FIG. 3*a* illustrates an example content of the telemetry 180 if the primary program is not tampered with. The program states in the telemetry are properly coded (e.g., in proper polynomial representation based on the public key 210) and/or in expected positions and sequences. Based on this telemetry content, the coprocessor 160 (running the verification logic 165) generates a proof that passes the check at the verifier computing device 120. FIG. 3*b* illustrates another example content of the telemetry 180 if the primary program is tampered with. The content may include program states that are improperly coded (e.g., not in proper polynomial representation based on the public key 210, illustrated in bold), not in expected positions or sequences, or missing entirely. Based on this telemetry content, the coprocessor 160 generates a proof that fails the check at the verifier computing device 120.

Figure 4:
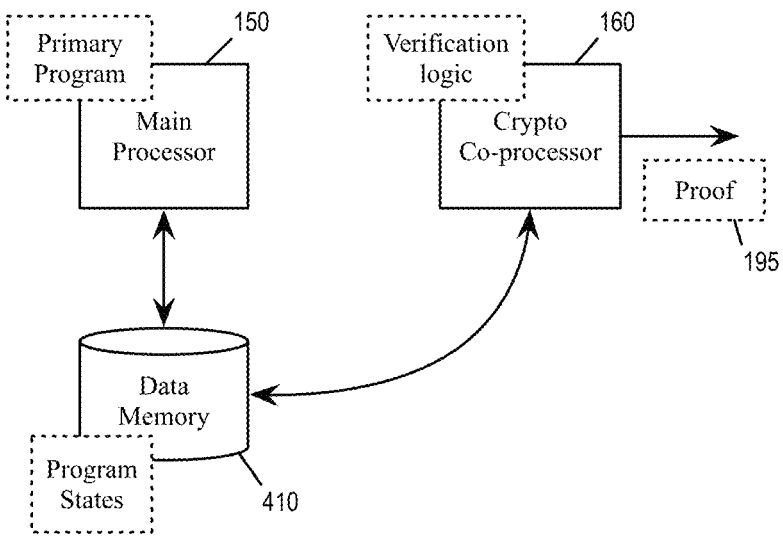
FIG. 4 illustrates a two-way cache-coherent interconnect as the link between the main processor and the coprocessor.

As illustrated in FIG. 1, the link 190 delivers the telemetry 180 from the main processor 150 to the coprocessor 160. In some embodiments, the link 190 is a two way link that allows the coprocessor 160 to affect the operations of the main processor 150 in real time. FIG. 4 illustrates a two-way cache-coherent interconnect as the link between the main processor 150 and the coprocessor 160, consistent with an exemplary embodiment.

As illustrated, the main processor 150 uses a data memory 410 to store data generated by the primary program 155, including program states of the primary program and other variables or status of the program. The data memory 410 is also accessible by the coprocessor 160, and the content of the data memory 410 is used as the telemetry 180 by the coprocessor 160 to generate the proof 195. In some embodiments, the coprocessor 160 may modify the content of the data memory 410, including temporary variables of the primary program. Thus, the primary program 155 running on the main processor 150 may be directly affected by the calculation of proof by the coprocessor 160. The sequences of program states of the primary program 155 may also be affected by the calculation of the proof at the coprocessor 160.

Figure 5:
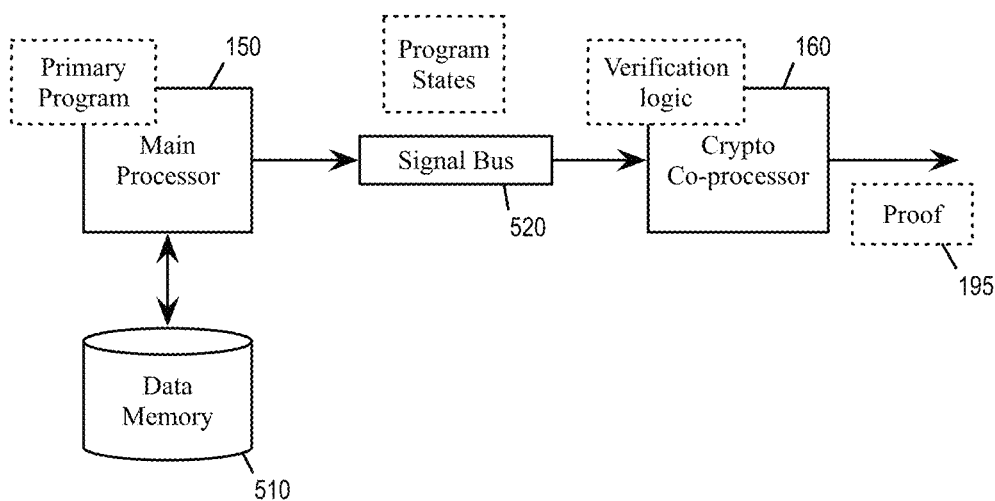
FIG. 5 illustrates a one-way transparent bus between the main processor and the coprocessor.

In some embodiments, the link 190 is a one-way link to pass the telemetry from the main processor to the coprocessor. FIG. 5 illustrates a one-way transparent bus between the main processor and the coprocessor. As illustrated, the program states generated by the main processor 150 is sent to the coprocessor 160 through a signal bus 520 as part of the telemetry. The calculation of the proof by the coprocessor 160 have no real time effect on the operations of the main processor 150. The main processor 150 uses a data memory 510 to store program states of the primary program and other variables. However, the coprocessor 160 has no write access to the data memory 510. In other words, the sequence of program states of the primary program is not affected by the calculation of the proof at the coprocessor 160.

Figure 6:
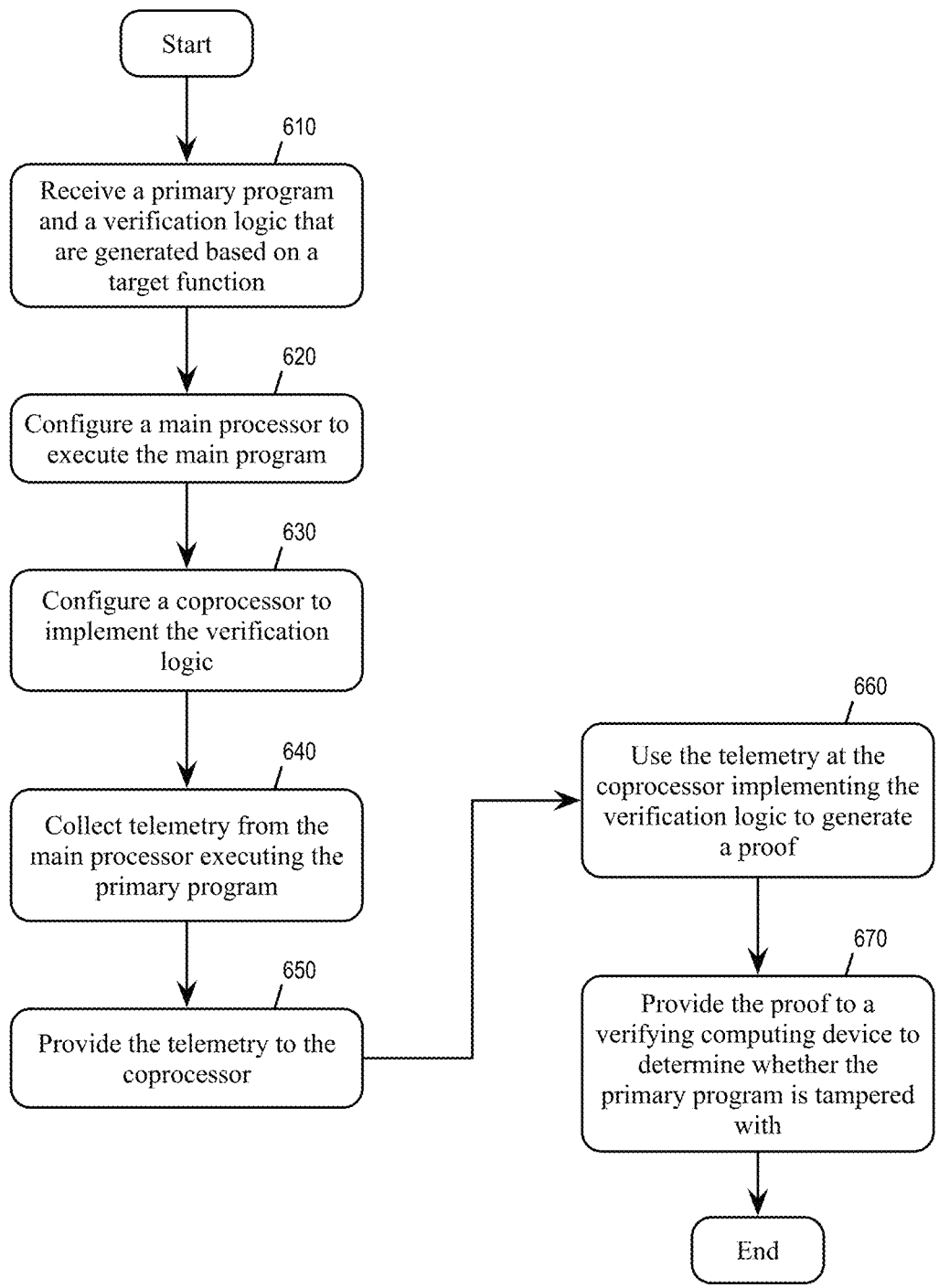
FIG. 6 conceptually illustrates a process for operating a verifiable computing system, consistent with an exemplary embodiment.

FIG. 6 conceptually illustrates a process 600 for operating a verifiable computing system, consistent with an exemplary embodiment. In some embodiments, the process 600 is performed by a worker computing device that uses a coprocessor to generate a proof for a primary program running on a main processor. In some embodiments, one or more processing units (e.g., processor) of a worker computing device in a verifiable computing system (e.g., the worker computing device 110) perform the process 600 by executing instructions stored in a computer readable medium.

The worker computing device receives (at step 610) a primary program and a verification logic that are generated based on a target function. The worker computing device configures (at step 620) a main processor to execute the primary program. The worker computing device configures (at step 630) a coprocessor to implement the verification logic. The coprocessor may be a configurable logic array that includes large number of parallel computing resources that can be configured to implement the verification logic to process telemetry of the main processor into a proof for determining whether the primary program is tampered with.

The worker computing device collects (at step 640) telemetry from the main processor while the main processor is executing the primary program. The telemetry may include program states of the primary program running at the main processor, or other variables or status of the program.

The worker computing device provides (at step 650) the telemetry to the coprocessor. In some embodiments, the telemetry is provided to the coprocessor by transferring the telemetry through a one-way transparent bus. In some embodiments, the telemetry is stored in a data memory of the main processor, such that the telemetry is provided to the coprocessor by allowing the coprocessor to access the data memory of the main processor through a two-way cache-coherent interconnect. In some of these embodiments, the coprocessor may modify content of the data memory and the modified content may affect execution of the primary program.

The worker computing device uses (at step 660) the telemetry at the coprocessor implementing the verification logic to generate a proof according to a set of mathematical operations. If the telemetry is properly coded and/or the program states are in expected positions and sequences, the set of mathematical operations is expected to generate a proof that passes the check at the verifier. On the other hand, if the telemetry includes program states that are improperly coded, not in expected positions or sequences, or missing entirely, the set of mathematical operations is expected to generate a proof that fails at the verifier.

The worker computing device provides (at step 670) the proof to a verifying computing device to determine whether the primary program is tampered with. The proof may be transmitted out of band from the execution of the program to a verifier to prove that the program was not tampered with and the result of the program is trustworthy.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
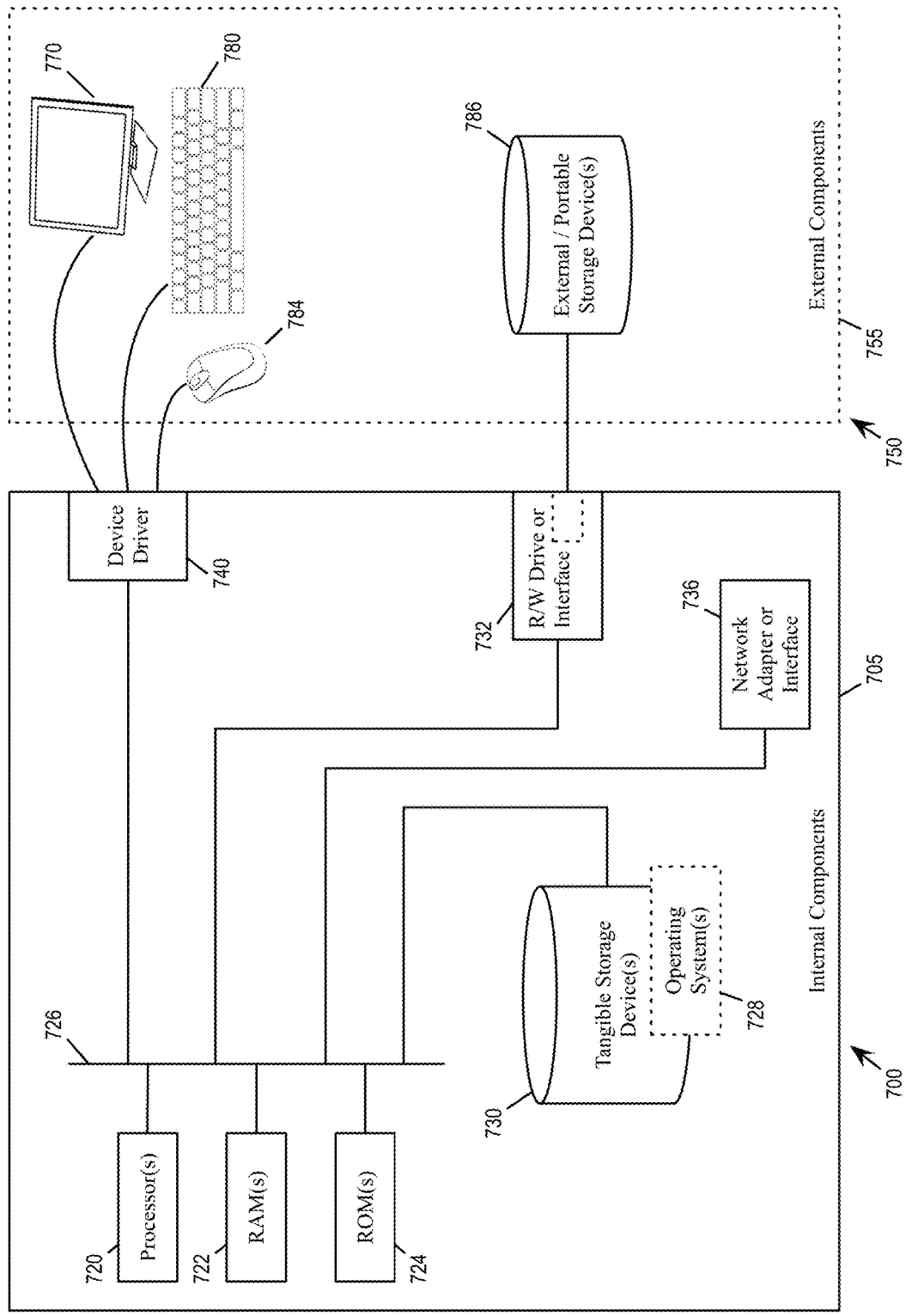
FIG. 7 shows a block diagram of the components of a data processing system in accordance with an illustrative embodiment of the present disclosure.

FIG. 7 shows a block diagram of the components of data processing systems 700 and 750 that may be used to implement a worker computing device in a verifiable computing system in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 705 and a set of external components 755 illustrated in FIG. 7. The set of internal components 705 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the process 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 705 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the process 600 can be stored on one or more of the respective portable computer-readable tangible storage devices 786, read via the respective R/W drive or interface 732 and loaded into the respective hard drive 730.

The set of internal components 705 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 755 can include a computer display monitor 770, a keyboard 780, and a computer mouse 784. The set of external components 755 can also include touch screens, virtual keyboards, touch pads, pointing devices, and other human interface devices. The set of internal components 705 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client computing devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 8:
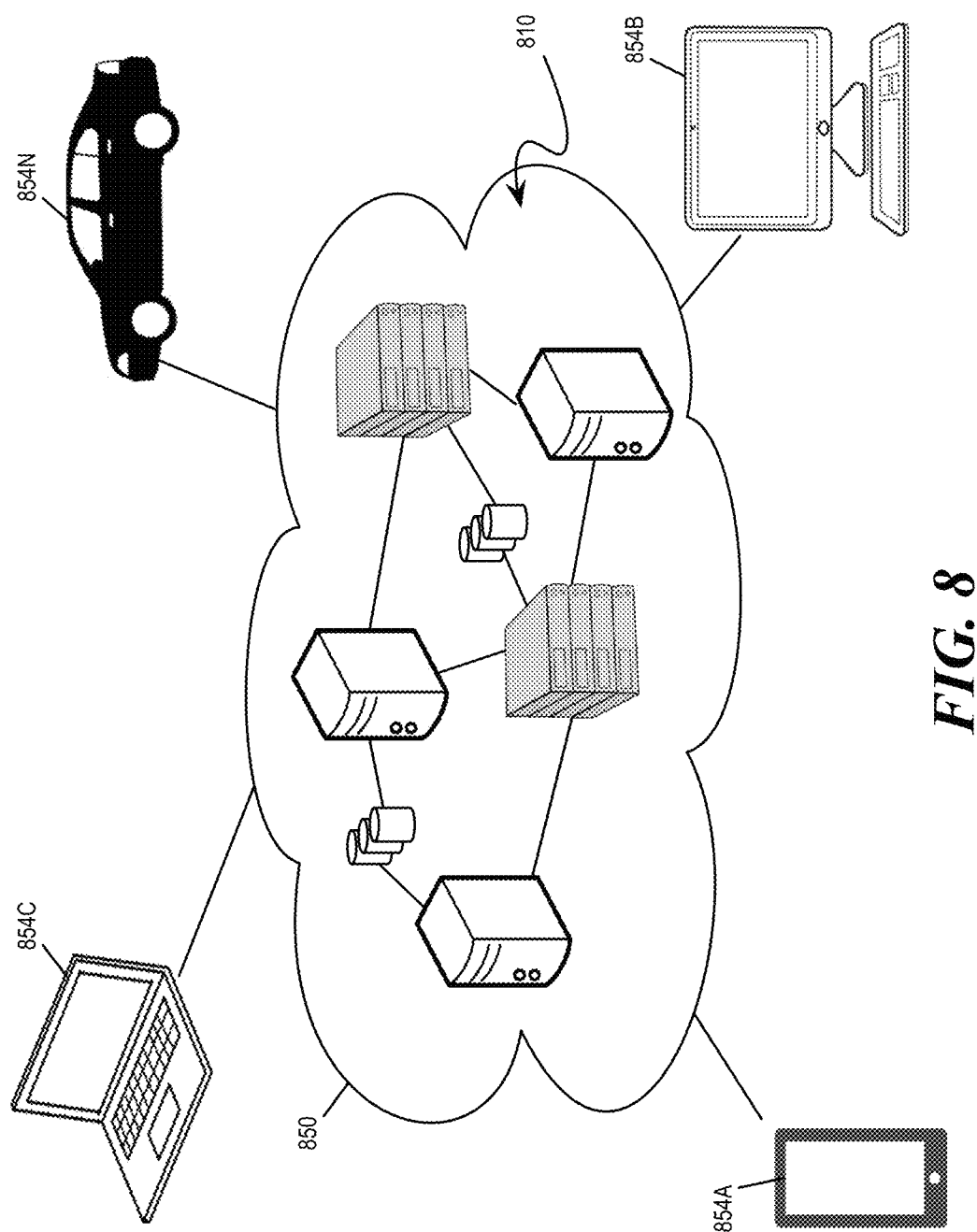
FIG. 8 illustrates an example cloud-computing environment.

Referring now to FIG. 8, an illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
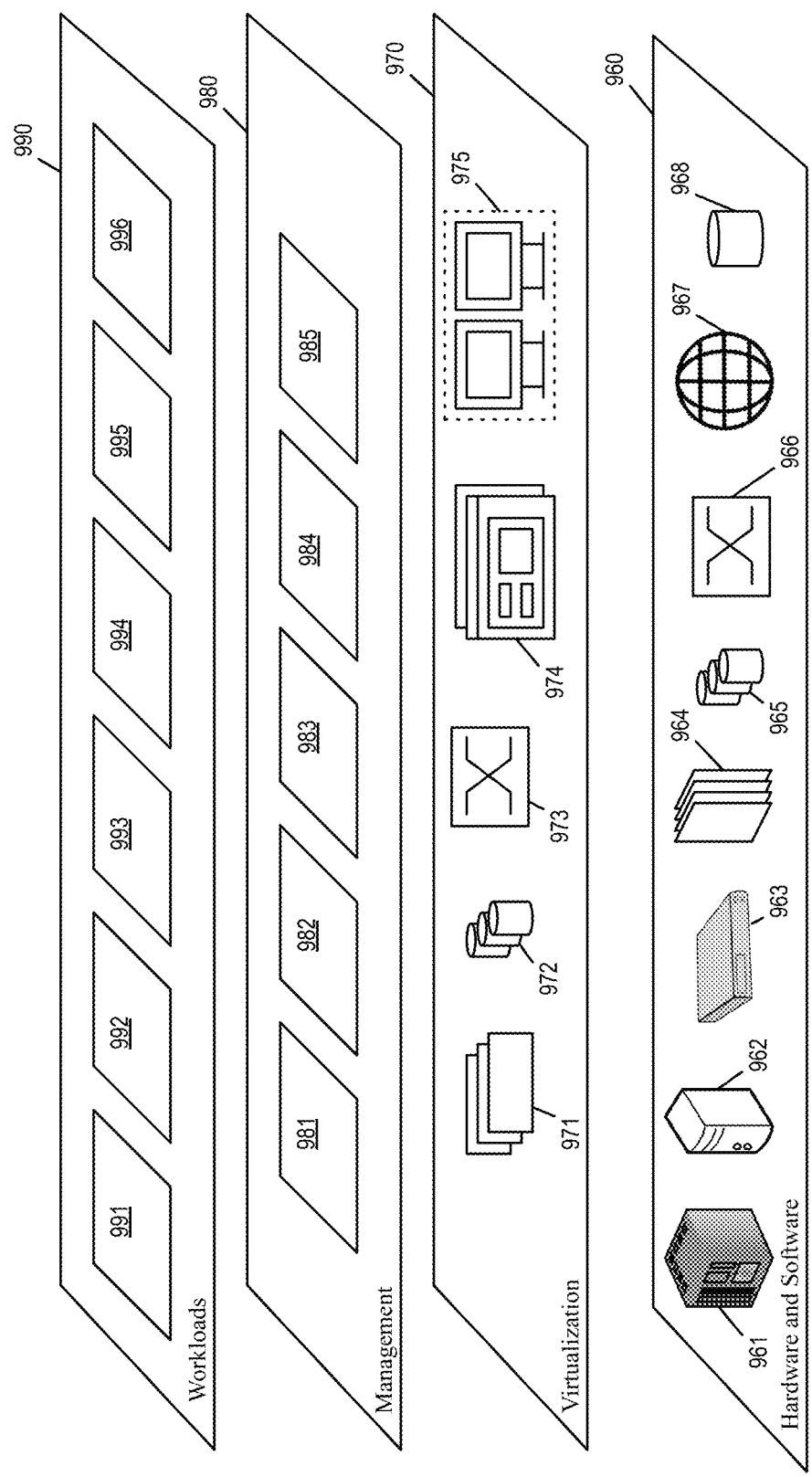
FIG. 9 illustrates a set of functional abstraction layers provided by a cloud-computing environment, consistent with an exemplary embodiment.

Referring now to FIG. 9, a set of functional abstraction layers provided by cloud computing environment 850 (of FIG. 8) is shown. It should be understood that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud-computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and workload 996. In some embodiments, the workload 996 performs some of the operations of the compiler computing device 130, the verifier computing device 120, and/or the client computing device 140. The workload 996 may also performs the function of the worker computing device 110 by distributing primary program and verification logic to main processor(s) and coprocessor(s) in worker computing devices 110.

The foregoing one or more embodiments implement a verifiable computing system within a computer infrastructure by having one or more computing devices having a main processor that runs primary programs of a target function and a coprocessor that generates a proof based on the telemetry of the main processor for determining whether the primary program is tampered with or not. The computer infrastructure is also used to compile the target function to generate the primary program and the verification logic to be run at the main processor and the coprocessor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, at a computing device comprising a main processor and a coprocessor, a primary program and a verification logic that are generated based on a target function;
    configuring the main processor to execute the primary program and the coprocessor to implement the verification logic;

collecting telemetry from the main processor executing the primary program;

using a two-way cache-coherent interconnect between the main processor and the coprocessor as a link to pass the telemetry that includes program states of the primary program, between the main processor and the coprocessor;

using the telemetry at the coprocessor implementing the verification logic to generate a proof; and providing the proof to a verifying computing device for determining whether a received output of the main processor related to the primary program is tampered with by the computing device.

2. The computer-implemented method of claim 1, wherein providing the telemetry to the coprocessor comprises transferring the telemetry through a one-way transparent bus.

3. The computer-implemented method of claim 1, wherein the telemetry is stored in a data memory of the main processor.

4. The computer-implemented method of claim 3, wherein:
the coprocessor modifies content of the data memory, and
the modified content affects execution of the primary program.

5. The computer-implemented method of claim 1, wherein the telemetry comprises program states of the primary program running at the main processor.

6. The computer-implemented method of claim 5, wherein:
the proof and the program states are generated according to a public key,
the verifier computing device checks the proof based on a private key, and
the public key and the private key are generated based on a security parameter.

7. A computing device comprising:
a main processor that is configured to:
execute a primary program of a target function and to generate telemetry of the primary program; and
use a two-way cache-coherent interconnect between the main processor and the coprocessor as a link to pass the telemetry that includes program states of the primary program between the main processor and a coprocessor wherein the coprocessor is configured to implement a verification logic of the target function that generate a proof to send to a verifier computing device to determine whether a received output of the main processor related to the primary program is tampered with by the main processor, the proof generated based on the generated telemetry.

8. The computing device of claim 7, wherein the interconnect comprises a one-way transparent bus for transferring the telemetry from the main processor to the coprocessor.

9. The computing device of claim 7, further comprising a data memory for storing the telemetry of the main processor and for providing the telemetry to the coprocessor.

10. The computing device of claim 9, wherein the coprocessor is configured to access the data memory of the main processor through a two-way cache-coherent interconnect.

11. The computing device of claim 9, wherein:
the coprocessor is configured to modify content of the data memory, and
the modified content affects execution of the primary program.

12. The computing device of claim 7, wherein the telemetry comprises program states of the primary program running at the main processor.

13. The computing device of claim 12, wherein:
the proof and the program states are generated according to a public key,
a verifier computing device is configured to check the proof based on a private key, and
the public key and the private key are generated based on a security parameter.

14. A computer program product comprising:
one or more non-transitory computer-readable storage devices and program instructions stored on at least one of the one or more non-transitory storage devices, the program instructions executable by a processor, the program instructions comprising sets of instructions for:
receiving a target function; and
compiling the target function to generate a primary program and a verification logic,
wherein:
the primary program configures a main processor of a worker computing device,
the verification logic configures a coprocessor of the worker computing device,
the configured main processor generates telemetry while executing the primary program,
a two-way cache-coherent interconnect between the main processor and the coprocessor is used as a link to pass the telemetry that includes program states of the primary program between the main processor and the coprocessor;
the generated telemetry is used by the coprocessor implementing the verification logic to generate a proof for determining whether the primary program is tampered with by the main processor, and
providing the proof to a verifying computing device for determining whether a received output of the main processor related to the primary program is tampered with by the worker computing device.

15. The computer program product of claim 14, wherein the worker computing device further comprises a one-way transparent bus for transferring the telemetry from the main processor to the coprocessor.

16. The computer program product of claim 14, wherein the worker computing device further comprises a data memory for storing the telemetry of the main processor and for providing the telemetry to the coprocessor.

17. The computer program product of claim 16, wherein the coprocessor is allowed to access the data memory of the main processor through a two-way cache-coherent interconnect.

18. The computer program product of claim 16, wherein:
the coprocessor modifies a content of the data memory, and
the modified content affects execution of the primary program.

19. The computer program product of claim 14, wherein the telemetry comprises program states of the primary program running at the main processor.

* * * * *